US006436319B1

(12) United States Patent
Sun et al.

(10) Patent No.: US 6,436,319 B1
(45) Date of Patent: Aug. 20, 2002

(54) METHOD OF PREPARING HOLLOW FIBER-TYPE SEPARATION MEMBRANE FROM HIGH DENSITY POLYETHYLENE

(75) Inventors: Hyang Sun, Goonpo; Yong Sang Yi, Seoul; Kyu Bong Rhee, Anyang, all of (KR)

(73) Assignee: Agency for Technology and Standards (KR)

( * ) Notice: Subject to any disclaimer, the term of this patent is extended or adjusted under 35 U.S.C. 154(b) by 0 days.

(21) Appl. No.: 09/482,428

(22) Filed: Jan. 13, 2000

(30) Foreign Application Priority Data

Apr. 27, 1999 (KR) .............................. 99-14943

(51) Int. Cl.[7] ........................ B29C 47/92; D01D 5/247; D01F 6/04
(52) U.S. Cl. ..................... 264/40.1; 264/41; 264/178 F; 264/184; 264/203; 264/209.1; 264/210.3; 264/210.6; 264/210.8; 264/211.14; 264/211.16; 264/561; 264/562; 264/563
(58) Field of Search ................ 264/40.1, 40.7, 264/41, 178 F, 184, 203, 210.3, 210.6, 210.8, 211.14, 211.16, 561, 562, 563, 209.1

(56) References Cited

U.S. PATENT DOCUMENTS 5,238,735 A * 8/1993 Nagou et al. ............ 428/304.4

* cited by examiner

*Primary Examiner*—Leo B. Tentoni
(74) *Attorney, Agent, or Firm*—F. Chau & Associates, LLP

(57) ABSTRACT

A method for preparing a hollow fiber-type separation membrane from high density polyethylene is provided, which includes the steps of: melt-spinning a mixture of a high density polyethylene and a diluting agent to produce a phase-separated undrawn hollow fiber; detecting a tensile strength of the undrawn fiber during an alternative and repetitive winding and unwinding procedure between two bobbins, said undrawn fiber being drawn during the alternative and repetitive winding and unwinding procedure; reducing a rotation speed of one of the two bobbins when the detected tensile strength is larger than a predetermined value; and increasing a rotation speed of one of the two bobbins when the detected tensile strength is smaller than the predetermined value to yield the hollow fiber-type separation membrane.

10 Claims, 6 Drawing Sheets

METHOD OF PREPARING HOLLOW FIBER-TYPE SEPARATION MEMBRANE FROM HIGH DENSITY POLYETHYLENE

BACKGROUND OF THE INVENTION

1. Field of the Invention

The present invention relates to a method for preparing a hollow fiber-type separation membrane from high density polyethylene, which can improve the water permeability and molecular weight cut-off of the membranes as well as control the distribution and size of their pores, thus providing various membranes for various uses. Also, the present invention is concerned with an apparatus which is suitable for conducting the method.

2. Description of the Prior Art

There have been great advances in the development of polymer membranes through which liquid phase materials are separated. In the early stages of the development of separation membranes, the membranes for microfiltration or precision filtration were of flat structure. Recently, hollow fibers have been developed, and their application for microfiltration membranes has brought about a great improvement in penetration area. Since the development of hollow fibers, the separation membranes have found numerous applications in various fields.

For separation membranes, there have been used various materials, including polysulfones (Japanese Pat. Publication No. Sho. 56-54164), photo-crosslinked polymers (Japanese, Pat. Laid-Open Publication Nos. Sho. 52-136107 and 58-84006), fluorine-containing polymers (Japanese Pat. Laid-Open Publication No. 59-166541), acetic acid cellulose, polyamide, and polyether sulfones.

Generally, in order to provide hollow fibers with separating functions, porous structures are imparted to them by various techniques, such as solvent exchange phase inversion, phase separation, zone drawing, etc.

For example, when hollow fiber-type separation membranes are prepared by a solution spinning method using a solvent exchange phase inversion technique, a polymer is dissolved, along with a pore-forming agent, in a solvent, after which the dissolved polymer is spun in a dry spinning manner or a dry and wet spinning manner. Then, the fibers thus obtained are subject to a nonsolvent in which the solvent is exchanged with nonsolvent components to form fine pores. In the course of the diffusion of the solvent into the nonsolvent, which is a coagulating bath, finger-like structures are formed, making the hollow fiber membrane an asymmetric membrane or a symmetric membrane in which the interior is identical to the exterior.

For the purpose of improving the permeability and separative selectivity of hollow fiber membranes, the hollow fiber membranes must be formed into the thinnest possible state to minimize their penetration resistance as long as they are durable to the pressures used. A reference directed to this end can be found in Korean Pat. Publication No. 92-1258 disclosing a separation membrane in which a buffer layer is formed between an active layer and a macro pore support layer. However, since the spinning solution for the membrane comprises a polymer, a main-pore forming agent, a sub-pore forming agent, inorganic salts, and surfactant and each of these components act as a factor to affect the fiber-making procedure, it is very difficult to select a spinning composition and process condition for optimal control. In addition, expensive polymers, such as polysulfones, are used. Further, secondary waste water is caused by the four or more chemical species used, and problems in economic and environmental aspects arise in association with the process. Surfactant, which is used to improve interfacial properties of the hollow fiber-type separation membrane, is feasibly washed out by industrial water and household water, so regard must be paid to the influence according to the agents added.

Conventional materials for separation membranes suffer from a disadvantage upon disposing waste water or industrial water. For example, acetic acid cellulose or polyamide separation membranes are not suitable for high temperature processes because the membranes are poor in thermal resistance. Polysulfone separation membranes are feasibly damaged by industrial waste water because of weak resistance to chemicals. As for membranes of fluorine-containing polymers, the polymers are hard to dissolve in ordinary solvents. In addition, the fouling in which solid contents of waste water adhere to separation membranes must be solved.

Problems are also found in conventional techniques of preparing separation membranes.

In the case of a solution spinning method, first, it is not environment-affinitive because the solvent and nonsolvent used produce pollution. Further, solvents are necessary for the used polymers. Separation of the spinning solution used costs a great deal and the solution is difficult to reuse because it is composed of various components of different properties. In addition, the components, such as polymers, solvents, nonsolvents, etc., are expensive. In order to use a membrane prepared by a solution spinning method in treating drinking water, an examination must be made of the toxicity of additives, such as surfactants, to the body.

For a phase separation method, using a diluting agent and nucleating agent, a polymer which is not melted at room temperature is diluted and melted at a high temperature and cooled. Then, during the cooling of the diluted solution, there takes place crystallization or phase separation in which a polymer rich phase and a polymer lean phase are formed. The finely porous membrane thus prepared is of a honey comb structure with a symmetry. However, the membrane provides a complex penetration path for a medium, so that it shows a high penetration resistance per hour and a low penetration efficiency. In addition, the membrane is short of the basic physical properties, such as water pressure resistance, which a separation membrane must possess.

When a separation membrane is prepared by a zone drawing method, a polymer resin, which is not melted at room temperature, is first melted at a high temperature. The melt is melt-spun through an extruder to prepare an undrawn fiber. After being given desired defects by addition of a gaseous strong acid, the undrawn fiber is subjected to mechanical zone drawing in a special drawing apparatus. The hollow fiber-type separation membrane thus obtained has a surface on which fibrils are formed with micropores therebetween. Although having a disadvantage of using toxic chemicals, this zone drawing method is now regarded as the most competitive by virtue of its advantages of being low in production cost and high in production yield.

SUMMARY OF THE INVENTION

Therefore, it is an object of the present invention to overcome the above problems encountered in prior arts and to provide a method for preparing an inexpensive separation membrane superior in necessary physical properties, such as chemical resistance, in which the performance of the membrane can be changed simply by controlling spinning conditions without the aid of an additive.

It is another object of the present invention to provide a preparing method of a separation membrane which is applicable for a broad spectrum of uses and superior in permeability and separative selectivity.

It is a further object of the present invention to provide a preparing method of a separation membrane, which can improve the water permeability and molecular weight cut-off of the membranes as well as control the distribution and size of their pores.

It is still another object of the present invention to provide an apparatus for preparing a separation membrane, in which the method of the present invention can be accomplished.

In one aspect, there is provided a method for preparing a hollow fiber-type separation membrane from high density polyethylene, comprising the steps of: melt-spinning a mixture of a high density polyethylene and a diluting agent to produce a phase-separated, undrawn hollow fiber; detecting a tensile strength of the fiber during an alternative and repetitive winding and unwinding procedure between two bobbins, said fiber being drawn during the alternative and repetitive winding and unwinding procedure; reducing a rotation speed of one of the two bobbins when the detected tensile strength is larger than a predetermined value; and increasing a rotation speed of one of the two bobbins when the detected tensile strength is smaller than the predetermined value. In one embodiment of the present invention, the winding and unwinding procedure of the undrawn fiber is repeated to a number which is determined depending on a preparation condition for the undrawn fiber.

In another aspect, the present invention provides an apparatus for preparing a hollow fiber-type separation membrane of high density polyethylene, comprising: a rereeling bobbin from which an undrawn hollow fiber is unwound; a take-up bobbin around which the undrawn hollow fiber is wound; a tensile strength means which is placed between the rereeling bobbin and the take-up bobbin; a connector block through which the tensile strength means is connected to a personal computer having a multi-functional input/output board; a first servomotor and a second servomotor which are connected to the take-up bobbin and the rereeling bobbin, respectively; and a motor controller 39 whose one side is connected to the connector block with the other side being connected to the first servomotor and the second servomotor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
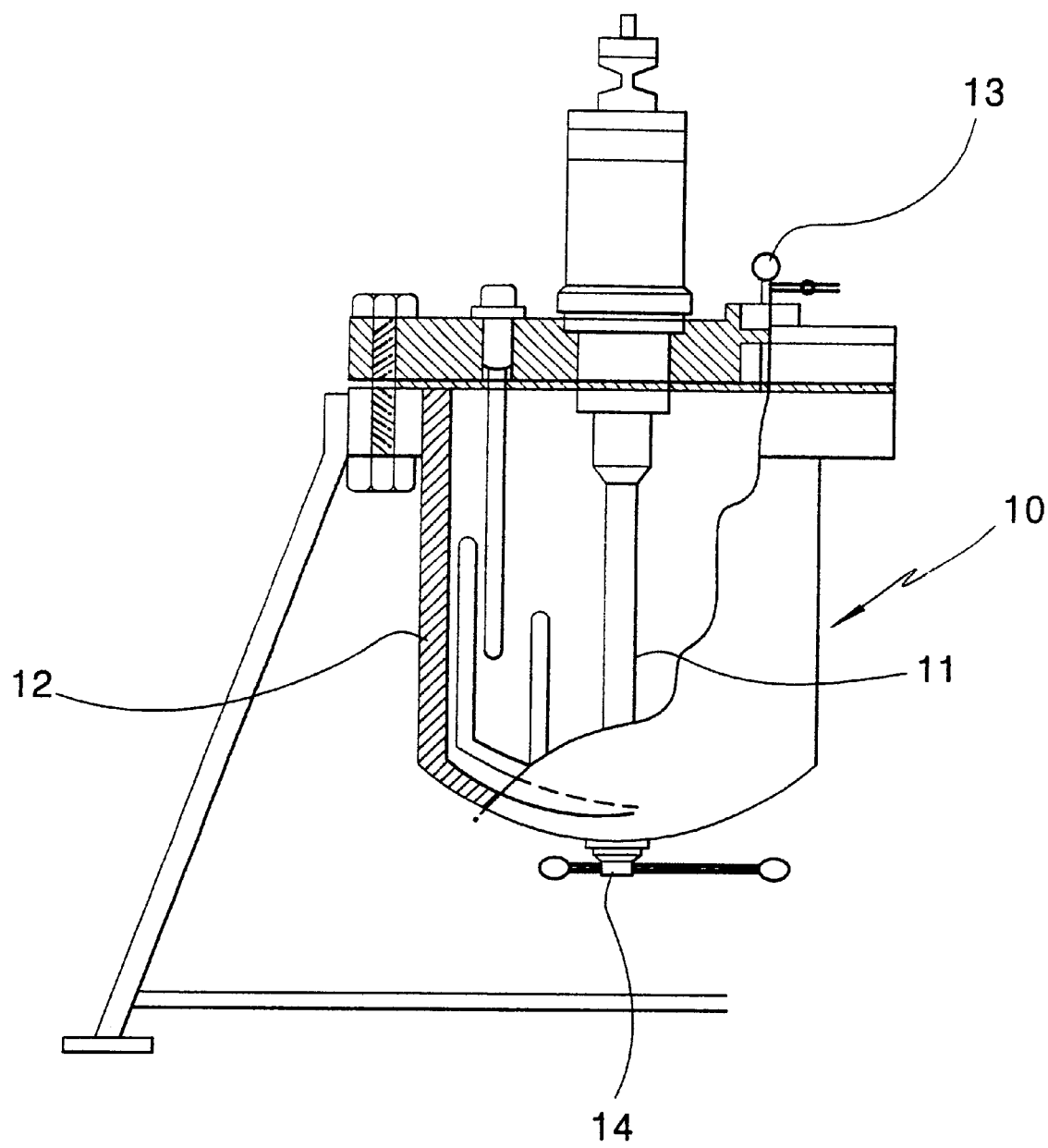
FIG. 1 is a partially broken elevation view showing a high temperature and high pressure kneader used to prepare a separation membrane according to the present invention.

Details will be given of the invention in conjunction with the drawings.

In order to prepare a hollow fiber-type separation membrane of a high density polyethylene, a spinning solution comprising a high density polyethylene, a diluting agent and an additive is melt-spun through a double tube-structured nozzle for hollow formation, after which the undrawn hollow fiber thus obtained is coagulated in a bath and subjected to a phase separation.

For the spinning solution, the additive is used at an amount of 0–10 weight % based on the weight of a mixture comprising 20–95 weight % of the high density polyethylene and 5–80 weight % of the diluting agent. Preferably, the high density polyethylene ranges, in amount, from 30 to 70 weight % while the diluting agent correspondingly ranges from 30 to 70 weight %.

Having a repeating unit represented by the following structural formula I, the high density polyethylene used in the spinning solution of the present invention can be controlled in molecular weight:

$$-(CH_2-CH_2-)_n- \qquad (I)$$

For example, preferable is a high density polyethylene which is in a powder state with an M.I. (melt index) controlled to be 1–20. Melt index represents a fluidity of a thermoplastic resin in a molten state and is defined as a discharged amount of the thermoplastic resin through a narrow hole of a cylinder for 10 min at a high temperature under a high pressure after a predetermined amount of the thermoplastic resin is charged in the heating cylinder of a melt flow indexer. As mentioned above, the high density polyethylene is preferably used at an amount of 30–70 weight %. For example, if the high density polyethylene is used at an amount less than 30 weight %, it is difficult to conduct melt-spinning. On the other hand, when too great a high density polyethylene is used, pores are very difficult to form by drawing.

Any diluting agent, if compatible with polyethylene, can be used in the present invention. Useful is liquid paraffin or decalin. A preferable amount of the diluting agent is within a range of 30–70 weight %. As in the high density polyethylene, the diluting agent is preferably used at an amount of 30–70 weight %.

Functioning to form pores at regular sizes over the entire area of the separation membrane, the additive forms fine pores in a polymer rich phase. Therefore, the separation membrane is improved in pore density and thus, in penetration performance, on the whole. Any additive, if compatible with polyethylene, can be used in the present invention. Preferable are olefin-based oligomer. As mentioned previously, the additive is preferably used at an amount of up to 10 weight % based on the weight of the polyethylene and the diluting agent. For example, when the additive is used at an amount greater than 10 weight %, the resulting hollow fiber-type separation membrane has a poor durability.

Notice must be taken of the fact that, because the pore formation can be changed by the compatibility among the additive, the diluting agent and the polyethylene when conducting phase separation by induced phase separation, the kind and content of the components play as very important factors in determining the size and homogeneity of pores.

With reference to FIG. 1, there is shown a high pressure and temperature kneader, denoted by reference numeral 10, which is used in preparing a separation membrane in accordance with the present invention. As seen, the kneader, which comprises a stirring rod 11, a high temperature and pressure tank 12, a pressure controller 13 and a nozzle 14, is structured to homogeneously knead materials. The modification of this structure may be easily conducted by those who are skilled in the art.

Figure 2:
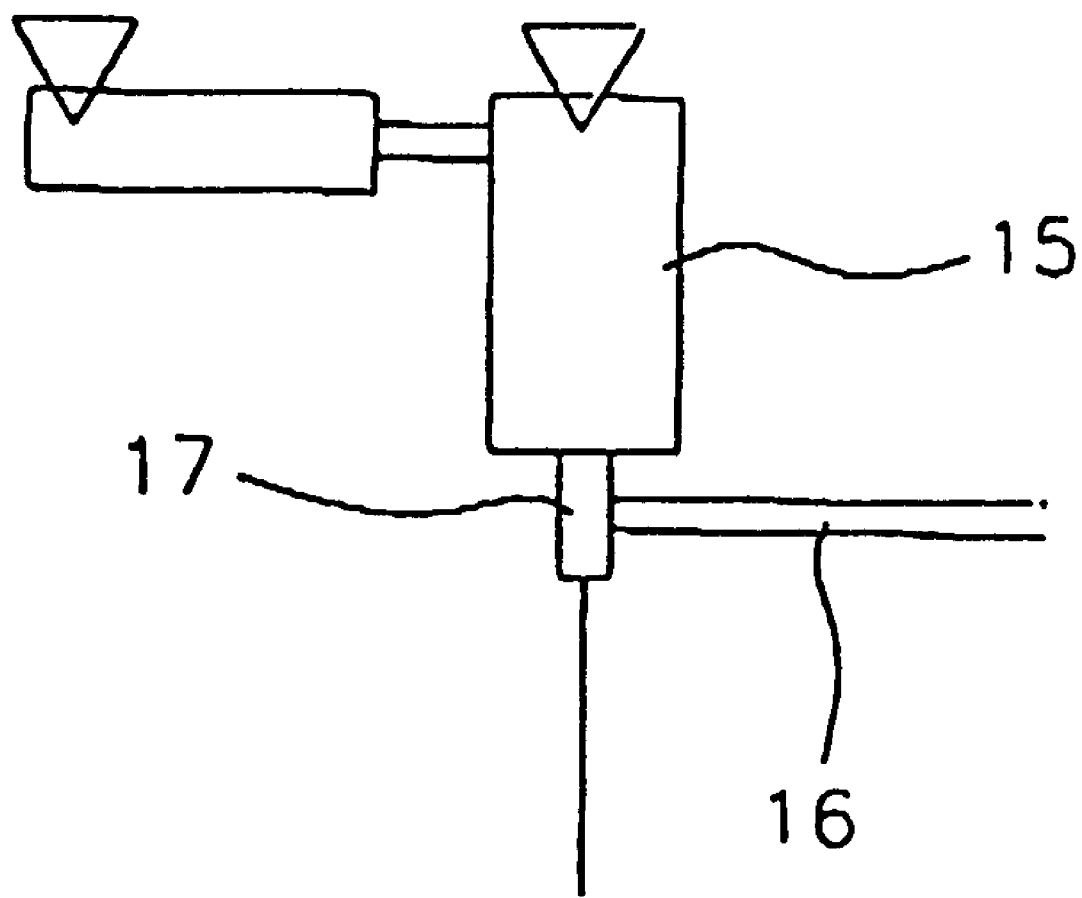
FIG. 2 is a schematic view illustrating a process flow for preparing a separation membrane according to the present invention.

With reference to FIG. 2, there is shown a process flow of preparing a separation membrane, according to the present invention.

First, a hollow fiber composition comprising a mixture of 30–70 weight % of a high density polyethylene and 70–30 weight % of a diluting agent, and an additive at an amount of 0–10 weight % based on the weight of the mixture, is homogeneously kneaded and powdered in the kneader 10 which is controlled to 150–250° C. and 70–120 psi. This powdered composition is melted in an extruder 15, quantitatively discharged by a gear pump (not shown), which serves as a precision melt pump, and passed through a spinneret 17 to make a hollow fiber. In this regard, nitrogen gas is injected through a nitrogen gas inlet 16 at an amount of 2–20 sccm. Gas injection has a great influence on the hollow fiber formation. The thickness of the hollow fiber-type separation membrane, which determines the penetration rate, is dependent on the amount and injection method of the gas injected. As a rule, the separation membrane becomes thinner and the penetration amount is increased as the injection amount of nitrogen gas is increased. However, where the injected nitrogen acts to activate shear normal stress which exerts a force at right angles to the spinning direction, a density increase is brought about in the normal direction of the fiber axis, making pores closed and thus, reducing the thickness of the hollow fiber membrane.

A solution spinning method for preparing a hollow fiber uses a solvent in order to minimize a Theological phenomenon. In this method, it is difficult to achieve an improvement in the physical properties of the hollow fiber by taking advantage of its morphology rather than the characteristic properties of the polymer used. However, various physical properties can be obtained by the spinning factors, such as crystallinity, orientation degree, etc, in the solution spinning method. In addition, since the viscosity of the molten polymer is very high and highly sensitive to temperature, the structure of fibers can be controlled with various process factors.

When a melt is spun with the aid of a diluting agent in accordance with present invention, a phase separation is induced by a temperature decrease using quenching air or a coagulating bath. Along with the Theological properties of a melt in which orientation is achieved at a certain viscosity or higher by a spinning force, the temperature control of both the quenching air and the coagulating bath serve as important factors in determining the structure of the separation membrane. Thus, these factors can be controlled to maximize the separation properties of the membrane. Upon spinning, the spinneret has a temperature of 140–200° C.

In an ordinary melt-spinning method, the polymer melt which has been just spun through a nozzle is cooled and solidified with quenching air, then, oiled to protect the fiber after the solidifying point and to prepare for the next process, and finally taken up. In the present invention, the cooling of the melt is induced with quenching air and in the coagulating bath, so that pores are formed owing to the phase separation based on the induced phase separation. The quenching air has a temperature of 5–30° C. while the coagulating bath is maintained at 10–30° C. As a coagulating solution, liquid paraffin, hexane, soybean oil, and decalin may be used alone or in combination.

In a solution spinning method, the solvent and pore-forming agent present in a prepared mixture are extracted or diffused externally in the coagulating bath after spinning and the sizes of micro pores are determined by the diffusion rate. In the present invention, however, pore formation does not result mainly from the extraction or diffusion of a diluting agent in a coagulating bath. Rather, although partially dependent on the kind of the coagulating solution, such as hexane, bean oil, and decalin and the temperature difference of the coagulating bath, the pore formation is owed largely to the phase separation which is thermally induced by the temperature difference of the melt and to the minute exchange attributable to the diffusion of the diluting agent in the coagulating bath.

In the present invention, the size of fine pores is controlled by a cold-drawing method.

During the solidification after extrusion, the melt-spun, hollow fiber-type separation membranes are induced into a phase separation, depending on the mix ratio of the polymer, diluting agent and additive and the temperatures upon the extrusion and the cooling. In the course of the crystallization, fine defects are formed in the hollow fiber-type separation membranes. When these hollow fiber-type separation membranes with the fine defects are cold-drawn according to a draw ratio, the defects are grown or developed to fine pores through the following mechanism: the defects present in the mixed system are deformed first in a polymer-lean phase by the external force, followed by transferring the stress to a polymer-rich phase. The formation of fine pores which endows the separation membranes with superior permeability and selectivity can be thus induced by cold-drawing at a cold-draw ratio of 0–250%.

For the cold-drawing, a description will be given of a circulation drawing technique, below.

In contrast to a zone drawing method in which an external stress is concentrically exerted on particular phases of an undrawn fiber to bring about a drawing effect, the circulation drawing method is characterized in that minute stresses are repetitively applied many times to fibers during which they are drawn, showing hysteresis through the repetition of stress and relaxation.

To this end, first, a mixture comprising 30–70 weight % of a high density polyethylene and 70–30 weight % of a diluting agent is melt-spun to obtain undrawn hollow fiber membranes in which phase separation is brought about (S1).

Figure 3:
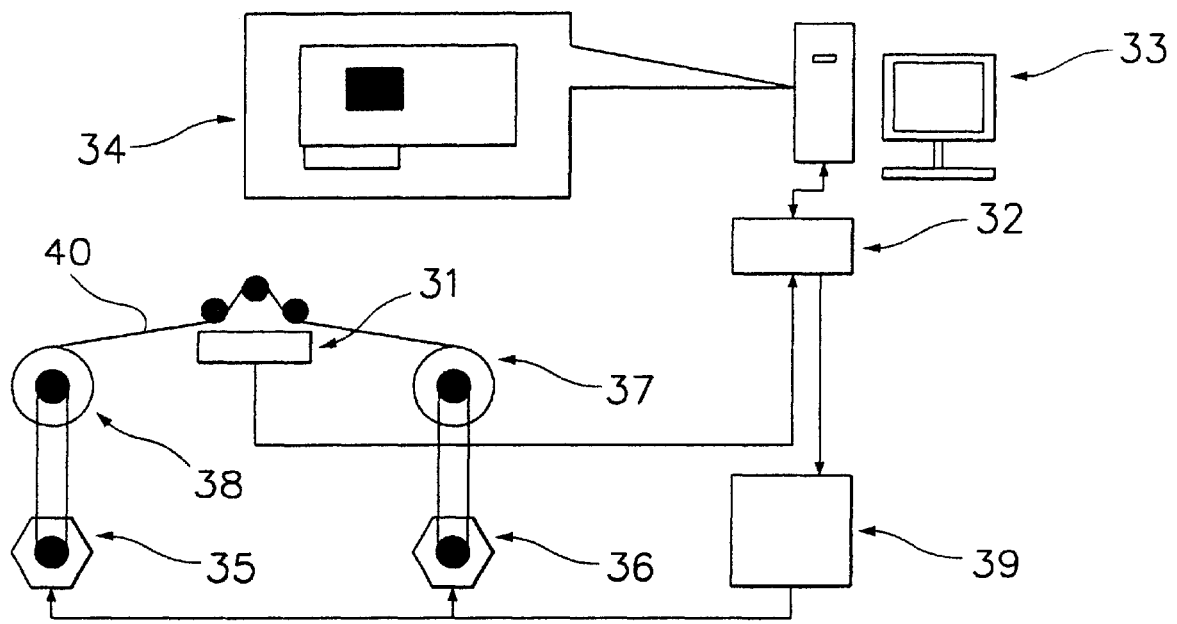
FIG. 3 is a schematic view illustrating a circulation drawing apparatus for preparing a hollow fiber-type separation membrane of high density polyethylene, in accordance with the present invention.

The undrawn hollow fiber membranes are installed in an apparatus for preparing high density polyethylene hollow fiber-type separation membranes, according to the present invention, that is, the circulation drawing apparatus which is shown in FIG. 3. As shown, the circulation drawing apparatus comprises a rereeling bobbin 37 from which an undrawn hollow fiber 40 is unwound, a take-up bobbin 38 around which the undrawn hollow fiber 40 is wound, a tensile strength means 31 which is placed between the rereeling bobbin 37 and the take-up bobbin 38, a connector block 32 through which the tensile strength means 31 is connected to a personal computer 33 having a multi-functional input/output board 34, a first servo motor 35 and a second servo motor 36 which are connected to the take-up bobbin 38 and the rereeling bobbin 37, respectively, and a motor controller 39 whose one side is connected to the connector block 32 with the other side being connected to the first servo motor 35 and the second servo motor 36.

In the circulation drawing apparatus, the undrawn hollow fiber membrane 40 is unwound from the rereeling bobbin 37, passed through the tensile strength means 31 and finally wound around the take-up bobbin 28. In the meanwhile, the tensile strength means 31 measures the tensile strength of the undrawn hollow fiber 40, which is caused by the difference in linear velocity between the bobbins 37 and 38.

The personal computer 33 has a program which can control tension constantly. Upon circulation drawing in accordance with a predetermined tensile strength in the constant tension controlling draw system, the fiber wound around the rereeling bobbin 37 was unwound, passed through the tensile strength means 31 and wound around the take-up bobbin 38. In the meantime, the tensile strength means 31 detects the tensile strength of the undrawn fiber (S2).

After detecting the tensile strength of the fiber, which is caused by the difference in linear velocity between the bobbins 37 and 38, the tensile strength means 31 outputs analog signals in volts, which are then transferred to the multi-functional input/output board 34 mounted in the personal computer 33 through the connector block 32. The analog signals (volt values) can be represented in g·f units (g: gravitational acceleration) as calculated from a standard. The analog voltage signals are captured by 50 scan/sec as sampling rate and quantized as a resolution of 12 bit (analogs converted into digitals), and the values are compared with the optimal tensile strength value predetermined in the tensile strength controlling draw system.

When the tensile strength values input through the tensile strength means 31 are larger than the predetermined value, the take-up bobbin 38 is controlled to decrease its rotation speed (S3). Otherwise, the rotation speed of the take-up bobbin 38 is increased (S4).

By virtue of the constant tension controlling draw system, the rotation speed of the rereeling bobbin 37 can be kept constant and, in the moment a signal is outputted from the tensile strength means 31, the rotation speed of the take-up bobbin 38 is controlled to 50 turns per second or higher so as for the tensile strength to reach the predetermined value.

Through this operation, external stress is concentrated on particular phases of the phase separation-induced, undrawn fiber and the repetition of this stress concentration causes hysteresis, subjecting the undrawn fiber to drawing.

With reference to FIG. 4, there are shown drawing progresses of fibers.

Figure 4A:
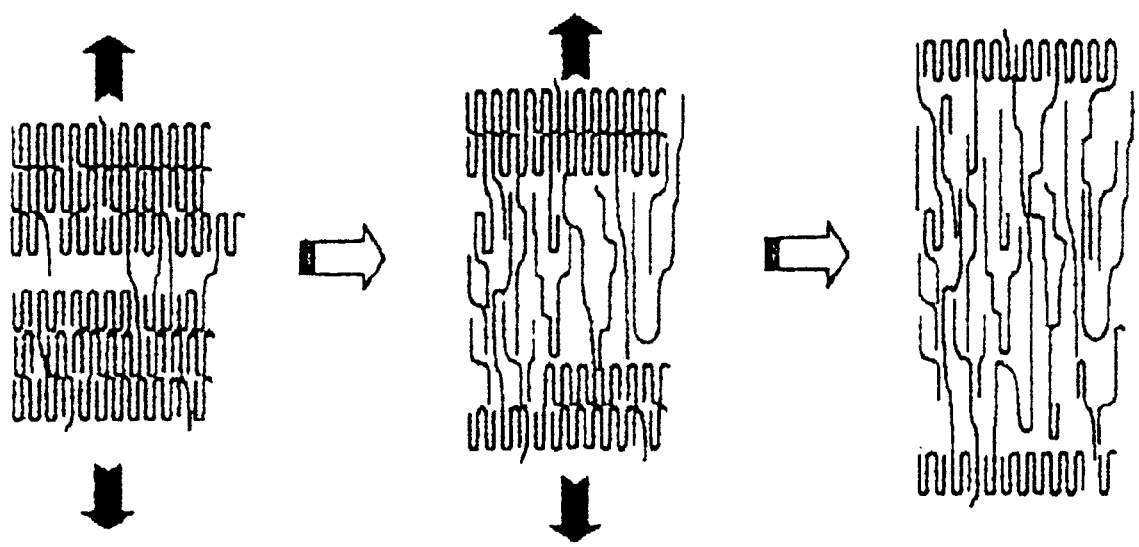
FIGS. 4a, 4b and 4c show drawing progresses of phase-separated, undrawn fibers.

In the leftmost panel of FIG. 4a, no external stresses are applied to an undrawn hollow fiber membrane composed of a polymer resin-diluting agent system. As seen, the undrawn hollow fiber membrane has a lamellar structure which is divided into a polymer-rich phase and a polymer-lean phase. When an external stress is applied to the undrawn hollow fiber membrane vertically to the growth direction (horizontal direction) of the lamellar structure, a fibril structure appears in the polymer-lean phase (intermediate panel). Further application of external stresses increases the lengths of the fibrils, separating the lamellar phases apart farther (rightmost panel of FIG. 4a).

Figure 4B:
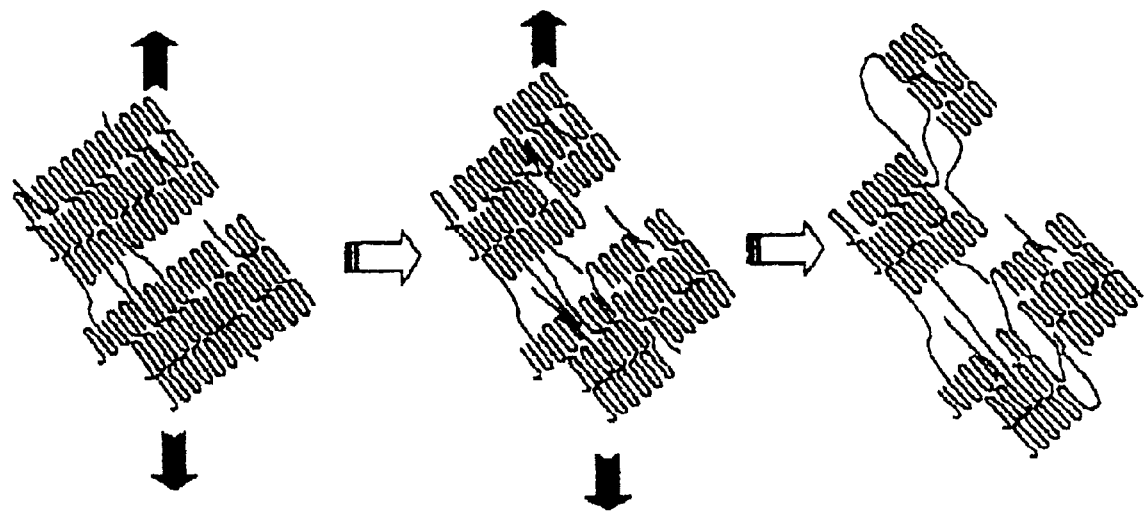

When an external stress is applied to the undrawn hallow fiber membrane at a certain angle to the growth direction of the lamellar structure as shown in FIG. 4b, fibrils are generated at the ends of the polymer chains amid the lamellar structure.

Figure 4C:
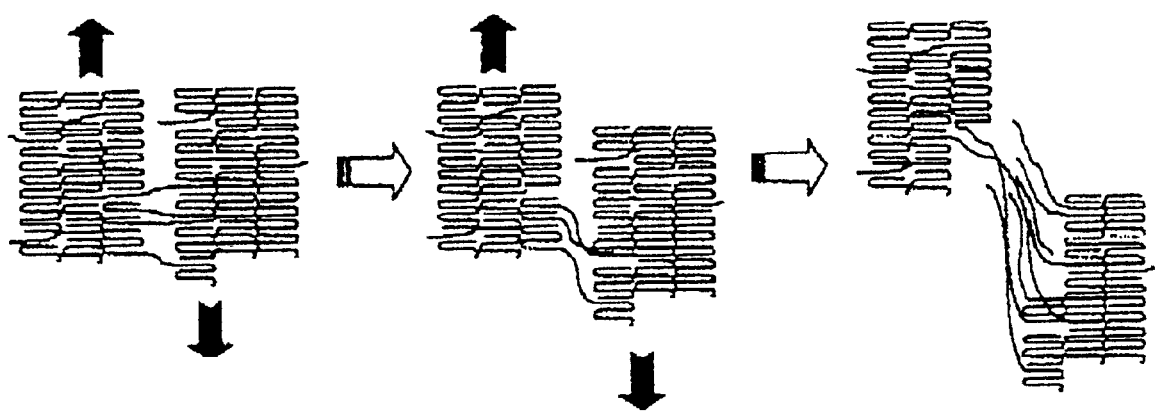

The application of external stresses in the growth direction of the lamellar structure results in more serious destruction of the lamellar structure, as shown in FIG. 4c.

Accordingly, where a separation membrane is prepared simply by a zone drawing method, its predominant drawn state appears as in FIG. 4a. In contrast, where a separation membrane is prepared by the circulation drawing method according to the present invention after phase separation, the separation membrane shows various drawn states as in FIGS. 4a to 4c.

In addition, the phase-separated, undrawn hollow fiber may be alternatingly and continuously drawn in the forward and backward directions between the rereeling bobbin and the take-up bobbin. While the undrawn hollow fiber is drawn in this circulative manner, the deformation caused by minute stress is accumulated in proportion to the number of the circulation drawings. Through the accumulated deformation, the distribution and size of fine pores in the membrane can be controlled. In result, the degree of the external stress applied to the fiber is dependent on its phase separation state. In order words, the initially predetermined value of tensile strength and the circulation number of the drawings are determined by the preparation condition for fibers because the deformation effect of the separation membrane is affected by such factors as a melting index of a polymer and a mix ratio.

As above-described, the present invention is characterized in that a novel spinning solution comprising a diluting agent and an additive is employed in melt-spinning and the pore formation in hollow fiber-type separation membranes is controlled through the phase separation based on induced phase separation and a drawing process. Accordingly, the present invention is simple and enables the permeability and selectivity of the membranes to be controlled by the processes.

A better understanding of the present invention may be obtained in light of the following examples which are set forth to illustrate, but are not to be construed to limit the present invention.

EXAMPLE I

A mixture comprising 40 weight % of a high density polyethylene, such as that manufactured by LG Petroleum, Korea, identified as "5000s", and 60 weight % of liquid paraffin (density 0.8–0.9) was homogeneously mixed at 200° C. under a pressure of 110 psi for 4 hours, and powdered. This powdered mixture was spun at a speed of 10 rpm through a hollow nozzle (2 mm$\phi$/4 mm$\phi$) maintained at 166° C. in an extruder. The spun fiber was passed through quenching air of 25° C. while a coagulating bath for the liquid paraffin was maintained at 25° C. After being taken-up, the membranes were cut into a predetermined length and immersed in a washing bath of 20° C. containing hexane for 24 hours to remove the diluting agent liquid paraffin. The membranes were dried and cold-drawn at a draw ratio of 200%.

The drawn fibers were made into a module which was then evaluated for water permeability and solute exclusivity. The water permeability was measured in an in-to-out manner while the pressure in the module was increased from 2 atm to 6 atm by use of pure water which had a specific resistivity of 15.0 M$\Omega$·cm at 25° C. For the measurement of the solute exclusivity, polyethyleneglycol (PEG) with a molecular weight of 2,000, 8,500, 10,000 and 20,000 each was dissolved to a 1% aqueous solution, allowed to flow in the module with a pressure of 2 or 3 atm and filtered through the module at 25° C. The effluents from the module were subjected to gel filtration chromatography in which the separation membrane of the present invention was found to be as good as or better than conventional products.

EXAMPLE II

Separation membranes were prepared in a similar manner to that of Example I, except that a mixture of 52 weight % of a high density polyethylene, such as that manufactured by LG Chemical, Korea, identified as "ME6000", and 48 weight % of liquid paraffin as a diluting agent was spun at a speed of 12 rpm through a nozzle maintained at 164° C.

and the spun fibers were cold-drawn. The membranes were made into a module which was then evaluated for water permeability and solute exclusivity as in Example I. The gel filtration chromatography showed that the hollow fiber-type separation membranes of the present invention were at least as good as conventional membranes.

EXAMPLE III

Separation membranes were prepared in a similar manner to that of Example I, except that a mixture of 50 weight % of a high density polyethylene, such as that manufactured by LG Chemical, Korea, identified as "ME6000", 47 weight % of liquid paraffin (density 0.8–0.9) as a diluting agent, and 3 weight % of an olefinic additive was homogeneously mixed at 180° C. under 11 psi for 4 hours, powdered, spun at a speed of 15 rpm through a nozzle maintained at 170° C. in an extruder, and cold-drawn at a draw ratio of 200%. The membranes were made into a module which was then evaluated for water permeability and solute exclusivity as in Example I. The gel filtration chromatography showed that the hollow fiber-type separation membranes of the present invention were as good as or better than conventional membranes.

EXAMPLE IV

Separation membranes were prepared in a similar manner to that of Example I, except that the coagulating bath was maintained at 10–30° C. or hexane, bean oil or decalin heated to 25° C. was used as a coagulating solution. Satisfactory results for water permeability and solute exclusivity were obtained from the module made from the separation membranes.

EXAMPLE V

An draw fiber was prepared from a mixture comprising 55 weight % of a high density polyethylene with an MI of 5, such as manufactured by LG Petroleum, Korea, and 45 weight % of liquid paraffin (density 0.8–0.9) as a diluting agent, and installed in the circulation drawing apparatus of the present invention, which is shown in FIG. 3. For the undrawn fiber wound around the rereeling bobbin, a tensile strength was set to be 1.5 g·f and predetermined in a personal computer while 200 rpm was input for the rotation speed of the rereeling bobbin. The constant tension controlling draw system was operated. After conducting circulation drawing once and twice, draw ratios of 4.7% and 21.3% were obtained respectively.

Each of the drawn fibers thus obtained was fabricated into a mini-module with an effective length of 15 cm, which was then immersed in ethanol for 2 hours. The modules were measured for water permeability. In this regard, pure water was introduced to the modules at a pressure of 3 atm and a measurement was made in an in-to-out manner for 10 min. The results are given in Table 1, below. As shown in Table 1, the water permeability increases with the increasing of the circulation number.

TABLE 1

| | Water Permeability ($1/m^2 \cdot hr \cdot atm$) | | |
|---|---|---|---|
| | Undrawn Fiber | After First Circulation Drawing | After Second Circulation Drawing |
| | 37.56 | 46.48 | 280.74 |

Alternatingly, decalin may be used as the diluting agent.

EXAMPLE VI

An undraw fiber was prepared from a mixture comprising 40 weight % of a high density polyethylene with an MI of 5, such as manufactured by LG Chemical, Korea, and 60 weight % of liquid paraffin (density 0.8–0.9) as a diluting agent, and installed in the circulation drawing apparatus of the present invention, which is shown in FIG. 3. For the fiber wound around the rereeling bobbin, a tensile strength was set to be 1.5 g·f and predetermined in a personal computer while 200 rpm was input for the rotation speed of the rereeling bobbin. The constant tension controlling draw system was operated. After conducting circulation drawing once and twice, draw ratios of 6% and 12% were obtained respectively.

Each of the drawn fibers thus obtained was fabricated into a mini-module with an effective length of 15 cm, which was then immersed in ethanol for 2 hours. The modules were measured for water permeability. In this regard, pure water was introduced to the modules at a pressure of 3 atm and a measurement was made in an in-to-out manner for 10 min. The results are given in Table 2, below. As shown in Table 2, the water permeability increases with the increasing of the circulation number.

TABLE 2

| | Water Permeability ($1/m^2 \cdot hr \cdot atm$) | |
|---|---|---|
| | Undrawn Fiber | After Second Circulation Drawing |
| | 26.263 | 357.47 |

Alternatingly, decalin may be used as the diluting agent.

EXAMPLE VII

An undraw fiber was prepared from a mixture comprising 40 weight % of a high density polyethylene with an MI of 5, such as manufactured by LG Chemical, Korea, and 60 weight % of liquid paraffin (density 0.8–0.9) as a diluting agent, and installed in the circulation drawing apparatus of the present invention, which is shown in FIG. 3. For the undrawn fiber wound around the rereeling bobbin, a tensile strength was set to be 1.5 g·f and predetermined in ae personal computer while 200 rpm was input for the rotation speed of the rereeling bobbin. The constant tension controlling draw system was operated. After conducting circulation drawing three times, a final draw ratio of 12% was obtained.

The drawn fibers thus obtained was fabricated into a mini-module with an effective length of 15 cm, which was then immersed in ethanol for 2 hours. The module was measured for permeation. In this regard, a 1 wt % PEG solution was introduced to the modules at a pressure of 3 atm and a measurement was made in an in-to-out manner for 10 min. The difference in reflective index between the influent and the effluent was measured by use of gel filtration chromatography (GFC) and the PEG density of the effluent was calculated from the measurement. Based on this result, the cut-off molecular weight of the module was obtained as shown in Table 3, below.

TABLE 3

| Integrated Area of GFC Elute of 1 wt % PEG solution | Integrated Area of GFC Elute After Fraction |
|---|---|
| 337.81 | 52.12 |

*% cut-off: 85%, Mw cut-off: PEG 20,000

Alternatingly, decalin may be used as the diluting agent.

As described hereinbefore, the present invention provides the preparation of a separation membrane, which overcomes conventional problems, from polyethylene, which is superb in chemical resistance and relatively inexpensive, by melting a solid mixture of the polyethylene and a diluting agent under a high temperature and pressure condition in an extruder and spinning the melt. In contrast to a conventional solution spinning method in which a solution having almost no viscosity is spun, the present invention can easily induce deformation in the orientation of polymer chains with external shear stress, so as to ameliorate the performance of the separation membrane. In addition, an improvement in permeability and separative selectivity can be attained by controlling the phase separation behavior and drawing of the undrawn fiber. Accordingly, simply by changing spinning and drawing conditions, a separation membrane can be obtained which is as thin as desired and has a maximal density of pores so far as pressure resistance and durability permit.

In addition to improving the water permeability and molecular weight cut-off of hollow fiber-type separation membranes, the present invention can control the distribution and size of the pores of the membranes, thereby providing various separation membranes for various uses.

Consequently, the limits in, for example, water permeability, which the undrawn fibers prepared by conventional phase separation or solvent exchange techniques have, can be overcome by the present invention.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing a hollow fiber-type separation membrane from high density polyethylene, comprising the steps of:

melt-spinning a mixture of a high density polyethylene and a diluting agent to produce a phase-separated undrawn hollow fiber;

detecting a tensile strength of the undrawn fiber during an alternative and repetitive winding and unwinding procedure between two bobbins, said undrawn fiber being drawn during the alternative and repetitive winding and unwinding procedure;

reducing a rotation speed of one of the two bobbins when the detected tensile strength is larger than a predetermined value; and increasing a rotation speed of one of the two bobbins when the detected tensile strength is smaller than the predetermined value to yield the hollow fiber-type separation membrane.

2. A method as set forth in claim 1, wherein the step of melt-spinning comprises the steps of powdering the mixture;

melt-spinning the mixture in an extruder having a nozzle of a double tube structure to produce an undrawn fiber; and inducing the undrawn fiber into a phase separation in a coagulating bath.

3. A method as set forth in claim 1, wherein the step of detecting, the step of reducing, and the step of increasing are conducted in real time.

4. A method as set forth in claim 1, wherein the high density polyethylene ranges, in melt index, from 1 to 20 and amounts to 30–70 weight % of the mixture while the diluting agent is selected from liquid paraffin or decalin and correspondingly amounts to 70–30 weight % of the mixture.

5. A method as set forth in claim 1, wherein the predetermined value is determined depending on a preparation condition for the undrawn fiber.

6. A method as set forth in claim 1, wherein the winding and unwinding procedure of the undrawn fiber is repeated to a number which is determined depending on a preparation condition for the undrawn fiber.

7. A method as set forth in claim 2, wherein the mixture is obtained by mixing the high density polyethylene and the diluting agent at 150–250° C. under 70–120 psi in a kneader.

8. A method as set forth in claim 2, wherein the undrawn fiber is solidified with quenching air maintained at 5–30° C. in advance of being introduced into the phase separation.

9. A method as set forth in claim 2, wherein the coagulating bath contains, as a coagulating solution, liquid, paraffin, soybean oil, and decalin alone or in combination.

10. A method as set forth in claim 2, wherein the coagulating bath is maintained at 10–30° C.

* * * * *